US012055878B2

(12) United States Patent
Kikuchi et al.

(10) Patent No.: US 12,055,878 B2
(45) Date of Patent: Aug. 6, 2024

(54) HEATING DEVICE WITH A HEAT CONDUCTOR INCLUDING PORTIONS HAVING DIFFERENT THICKNESSES

(71) Applicant: Toshiba Tec Kabushiki Kaisha, Tokyo (JP)

(72) Inventors: Kazuhiko Kikuchi, Yokohama Kanagawa (JP); Sasuke Endo, Chigasaki Kanagawa (JP); Masaya Tanaka, Sunto Shizuoka (JP); Ryota Saeki, Sunto Shizuoka (JP); Kiyotaka Murakami, Mishima Shizuoka (JP); Kousei Miyashita, Sunto Shizuoka (JP); Ryosuke Kojima, Sunto Shizuoka (JP); Yohei Doi, Mishima Shizuoka (JP); Yuki Kawashima, Tagata Shizuoka (JP); Eiji Shinohara, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/308,633

(22) Filed: Apr. 27, 2023

(65) Prior Publication Data

US 2023/0259058 A1 Aug. 17, 2023

Related U.S. Application Data

(63) Continuation of application No. 17/696,786, filed on Mar. 16, 2022, now Pat. No. 11,669,033, which is a (Continued)

(30) Foreign Application Priority Data

Sep. 2, 2019 (JP) ................................ 2019-159395

(51) Int. Cl.
*G03G 15/20* (2006.01)

(52) U.S. Cl.
CPC ..... *G03G 15/2053* (2013.01); *G03G 15/2064* (2013.01)

(58) Field of Classification Search
USPC .......................................................... 399/330
See application file for complete search history.

(56) References Cited

U.S. PATENT DOCUMENTS

| | | | |
|---|---|---|---|
| 9,612,556 | B2 | 4/2017 | Ogino et al. |
| 2006/0045589 | A1 | 3/2006 | Iwasaki et al. |

(Continued)

FOREIGN PATENT DOCUMENTS

| | | | |
|---|---|---|---|
| EP | 3470930 A1 | 4/2019 | |
| JP | H05-289555 A | 11/1993 | |

(Continued)

OTHER PUBLICATIONS

Extended European Search Report mailed Dec. 11, 2020 in corresponding European Patent Application No. 20186281.0, 5 pages.

(Continued)

*Primary Examiner* — Quana Grainger
(74) *Attorney, Agent, or Firm* — Kim & Stewart LLP

(57) ABSTRACT

A heating device includes a rotatable film, a heater disposed inside the film and including a substrate that extends along a first direction and having two surfaces opposite to each other, and a heater element on one of the surfaces of the substrate, and a heat conductor including a first portion contacting the other surface of the substrate, and a second portion that is adjacent to the first portion in a second direction perpendicular to the first direction and does not contact the other surface of the substrate. A width of the second portion is wider than the heater element in the second direction.

16 Claims, 16 Drawing Sheets

Related U.S. Application Data continuation of application No. 17/242,205, filed on Apr. 27, 2021, now Pat. No. 11,307,522, which is a continuation of application No. 16/880,935, filed on May 21, 2020, now Pat. No. 11,106,164.

(56) References Cited

U.S. PATENT DOCUMENTS

| | | | | |
|---|---|---|---|---|
| 2007/0116502 | A1 | 5/2007 | Shimizu et al. | |
| 2014/0186078 | A1 | 7/2014 | Imaizumi et al. | |
| 2014/0199100 | A1 | 7/2014 | Seol et al. | |
| 2015/0139706 | A1 | 5/2015 | Fujiwara et al. | |
| 2016/0098001 | A1 | 4/2016 | Ogawa et al. | |
| 2016/0109834 | A1 | 4/2016 | Kadowaki et al. | |
| 2017/0308009 | A1 | 10/2017 | Mochizuki | |
| 2018/0335731 | A1* | 11/2018 | Ogura | G03G 15/205 |
| 2018/0373186 | A1 | 12/2018 | Sato et al. | |

FOREIGN PATENT DOCUMENTS

| | | | |
|---|---|---|---|
| JP | 2015219510 | A | 12/2015 |
| JP | 2017194719 | A | 10/2017 |
| JP | 2019074606 | A | 5/2019 |

OTHER PUBLICATIONS

Notice of Reasons for Refusal mailed May 16, 2023, in corresponding Japanese Patent Application No. 2019-159395, 10 pages (with Translation).

* cited by examiner

HEATING DEVICE WITH A HEAT CONDUCTOR INCLUDING PORTIONS HAVING DIFFERENT THICKNESSES

CROSS-REFERENCE TO RELATED APPLICATIONS

This application is a continuation of U.S. patent application Ser. No. 17/696,786, filed on Mar. 16, 2022, which is a continuation of U.S. patent application Ser. No. 17/242,205, filed on Apr. 27, 2021, now U.S. Pat. No. 11,307,522, granted on Apr. 19, 2022, which is a continuation of U.S. patent application Ser. No. 16/880,935, filed on May 21, 2020, now U.S. Pat. No. 11,106,164, granted on Aug. 31, 2021, which is based upon and claims the benefit of priority from Japanese Patent Application No. 2019-159395, filed on Sep. 2, 2019, the entire contents of each of which are incorporated herein by reference.

FIELD

Embodiments described herein relate generally to a heating device and an image processing apparatus.

BACKGROUND

An image forming apparatus for forming an image on a sheet such as an MFP (multi-function printer/peripheral) has a fixing unit for fixing a toner to the sheet. The fixing unit is required to generate sufficient heat so that the image forming apparatus can start printing as quickly as possible.

DETAILED DESCRIPTION

One or more embodiments provide a heating unit and an image processing device.

A heating device according to an embodiment includes a rotatable film, a heater disposed inside the film and including a substrate that extends along a first direction and having two surfaces opposite to each other, and a heater element on one of the surfaces of the substrate, and a heat conductor including a first portion contacting the other surface of the substrate, and a second portion that is adjacent to the first portion in a second direction perpendicular to the first direction and does not contact the other surface of the substrate. A width of the second portion is wider than the heater element in the second direction.

Figure 1:
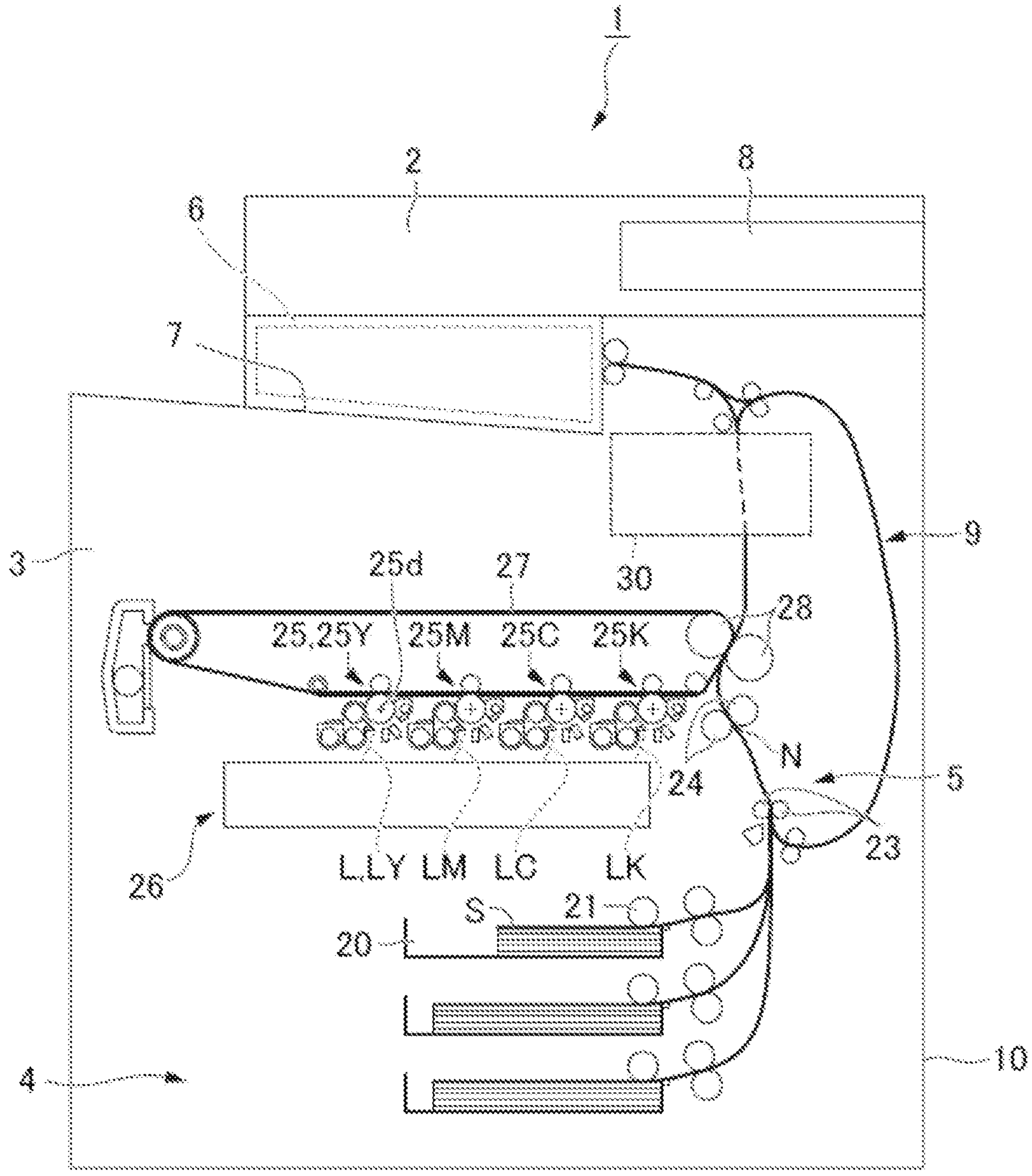
FIG. 1 is a schematic diagram of an image processing apparatus according to an embodiment.

FIG. 1 is a schematic diagram of an image processing apparatus 1 according to an embodiment. For example, the image processing apparatus 1 is an image forming apparatus such as a multifunction printer (MFP). The image processing apparatus 1 performs a process of forming an image on a sheet of paper S.

The image processing apparatus 1 includes a housing 10, a scanner unit 2, an image forming unit 3, a sheet supply unit 4, a conveyance unit 5, a sheet discharge tray 7, an inversion unit 9, a control panel 8, and a control unit or a controller 6.

The housing 10 houses each component of the image processing apparatus 1.

The scanner unit 2 reads an image formed on a sheet as light and dark of light signals and generates an image signal of the image. The scanner unit 2 outputs the generated image signal to the image forming unit 3.

The image forming unit 3 forms an output image such as a toner image by using a recording agent (such as toner) according to the image signal received from the scanner unit 2 or an image signal received from another apparatus via a network. The image forming unit 3 transfers the output image onto the surface of the sheet S. When the output image is a toner image, the image forming unit 3 then heats and presses the toner image against the surface of the sheet S to fix the toner image to the sheet S.

The sheet feeding unit 4 supplies sheets S one by one to the conveying unit 5 at a time synchronized with the timing at which the image forming unit 3 forms the toner image. The sheet supply unit 4 includes a sheet storage unit 20 and a pickup roller 21.

The sheet storage unit 20 stores the sheets S having a particular size and type.

The pickup roller 21 takes out the sheets S one by one from the sheet storage unit 20. The pickup roller 21 supplies the taken-out sheet S to the conveying unit 5.

The conveyance unit 5 conveys the sheet S supplied from the sheet supply unit 4 to the image forming unit 3. The conveying unit 5 includes conveying rollers 23 and registration rollers 24.

The conveying rollers 23 convey the sheet S from the pickup roller 21 to the registration rollers 24. The conveying rollers 23 press the leading end of the sheet S against a nip N formed by the registration rollers 24.

The registration rollers 24 adjust the sheet S position at the nip N to adjust the position of the leading end of the sheet S along the conveying direction. The registration rollers 24 then convey the sheet S along the conveying direction in accordance with the timing at which the image forming unit 3 transfers the toner image to the sheet S.

The image forming unit 3 includes a plurality of image forming units 25, a laser scanning unit 26, an intermediate transfer belt 27, a transfer unit 28, and a heating unit 30.

Each of the image forming units 25 includes a photosensitive drum 25*d*. The image forming unit 25 forms a toner image corresponding to the image signal received from the scanner unit 2 or another apparatus on the corresponding photosensitive drum 25*d*. The image forming units 25Y, 25M, 25C and 25K form toner images of yellow, magenta, cyan and black toners, respectively.

A charging device, a developing device, and the like are disposed around each photosensitive drum 25*d*. The charging device electrostatically charges the surface of the corresponding photosensitive drum 25*d*. Each developing device contains developer including one of yellow, magenta, cyan and black toners. The developing device develops an electrostatic latent image formed on the photosensitive drum 25*d*. As a result, a toner image is formed on each photosensitive drum 25*d* by the corresponding color of toner.

The laser scanning unit 26 scans each charged photosensitive drum 25*d* with a laser beam L to selectively expose the photosensitive drum 25*d* according to image data to be printed. The laser scanning unit 26 exposes the photosensitive drum 25*d* of each of the image forming units 25Y, 25M, 25C and 25K with the corresponding laser beam LY, LM, LC and LK. In this manner, the laser scanning unit 26 forms the electrostatic latent image on each photosensitive drum 25*d*.

The toner image formed on the surface of each photosensitive drum 25*d* is first transferred (primary transfer) to the intermediate transfer belt 27. The transfer unit 28 next transfers the toner image on the intermediate transfer belt 27 onto the surface of the sheet S at a secondary transfer position.

The heating unit 30 heats and presses the toner image that has been transferred to the sheet S to fix the toner image on the sheet S.

The inversion unit 9 inverts the sheet S to form an image on the back surface of the sheet S. The inversion unit 9 inverts the sheet S after the sheet S has passed the heating unit 30 by a switch-back or the like. The inversion unit 9 conveys the inverted sheet S back to the registration rollers 24 by a switch-back route or path.

The sheet discharge tray 7 holds the printed sheets S after discharge from the heating unit 30.

The control panel 8 is an input unit for an operator to input information to operate the image processing apparatus 1. The control panel 8 includes a touch panel and various hardware keys.

The control unit 6 controls each unit of the image processing apparatus 1.

Figure 2:
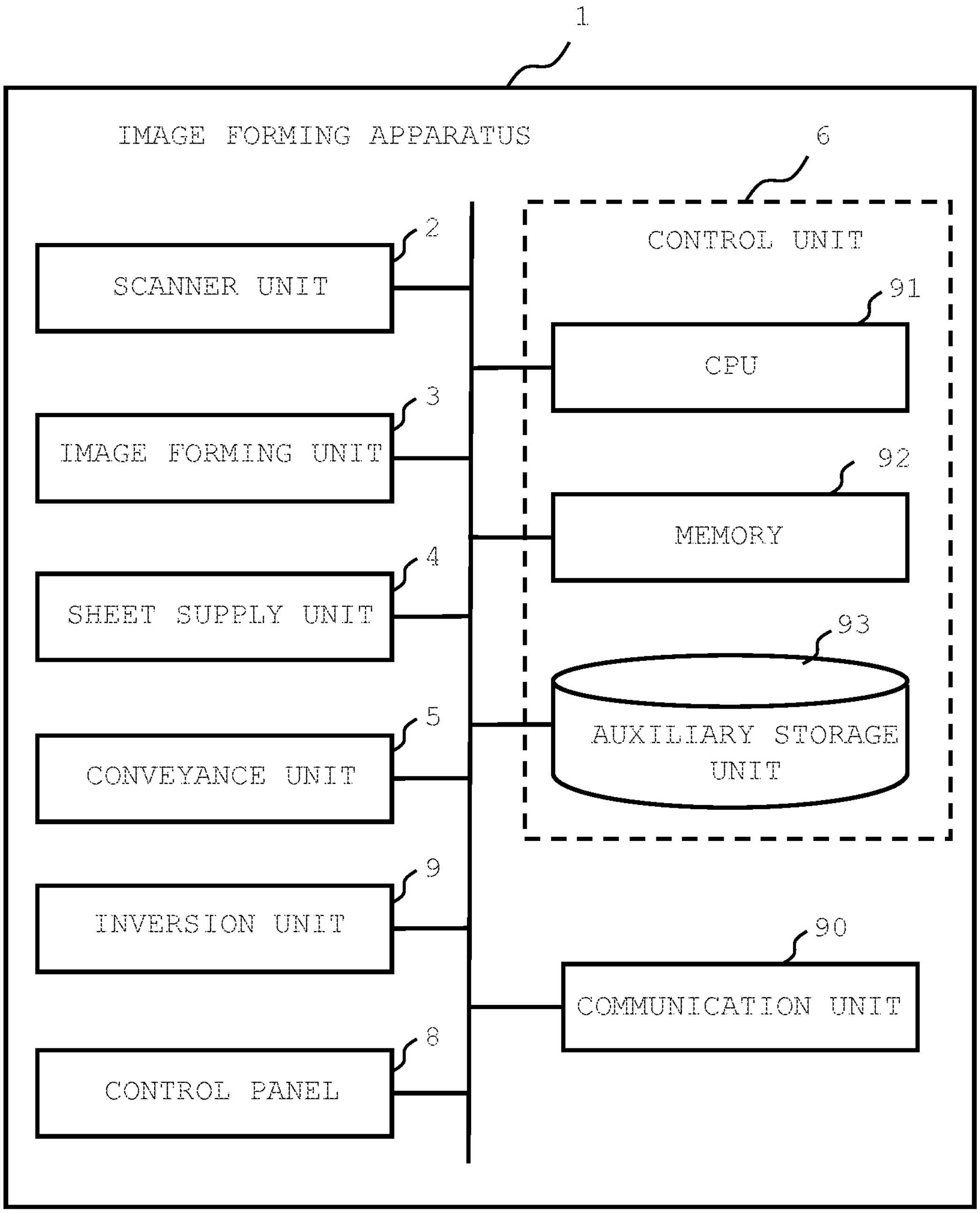
FIG. 2 is a hardware block diagram of an image processing apparatus according to an embodiment.

FIG. 2 is a hardware block diagram of the image processing apparatus 1. The image processing apparatus 1 includes the scanner unit 2, the image forming unit 3, the sheet supply unit 4, the conveyance unit 5, the inversion unit 9, the control panel 8, the control unit 6, an auxiliary storage device 93, and a communication unit 90. Those components are connected by a bus. The control unit 6 includes a CPU (Central Processing Unit) 91 and a memory 92, and is configured to execute a program or programs to control each unit of the image processing apparatus 1.

The CPU 91 executes programs stored in the auxiliary storage device 93 and loaded onto the memory 92. The CPU 91 controls the operations of each unit of the image processing apparatus 1.

The auxiliary storage device 93 is a storage device such as a magnetic hard disk device (HDD) or a semiconductor storage device (SSD). The auxiliary storage device 93 stores programs to be executed by the CPU 91 and information required or generated by the programs.

The communication unit 90 is a network interface for communicating with an external apparatus via a network.

Figure 3:
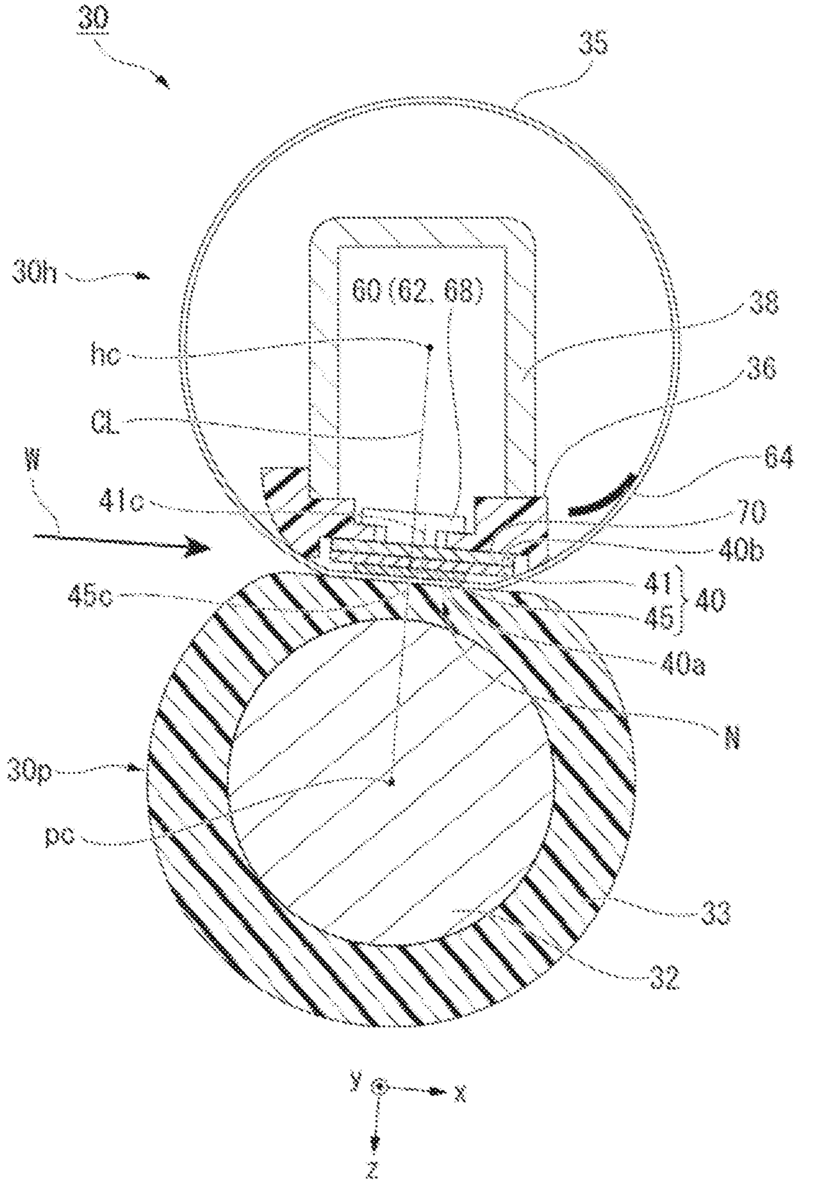
FIGS. 3 and 4 are cross-sectional views of aspects of a heating unit according to an embodiment.

FIG. 3 is a cross-sectional view of the heating unit 30 according to an embodiment. For example, the heating unit 30 is a fixing unit. The heating unit 30 includes a pressing roller 30*p* and a heated roller 30*h*. The heated roller 30*h* may be referred to in some contexts as a heating drum, fixing belt, or a film unit.

The pressing roller 30*p* forms a nip N with the heated roller 30*h*. The pressing roller 30*p* presses the toner image formed on the sheet S that has entered the nip N. The pressing roller 30*p* rotates to convey the sheet S. The pressing roller 30*p* includes a core metal 32, an elastic layer 33, and a release layer (not separately depicted).

The core metal 32 is formed in a cylindrical shape by a metal material such as stainless steel. Both end portions in the axial direction of the core metal 32 are rotatably supported. The core metal 32 is driven to rotate by a motor or the like. The core metal 32 comes into contact with a cam member or the like. The cam member can be rotated to move the core metal 32 toward and away from the heated roller 30*h*.

The elastic layer 33 is formed of an elastic material such as silicone rubber. The elastic layer 33 has a constant thickness on the outer peripheral surface of the core metal 32.

The release layer is formed of a resin material such as PFA (tetrafluoroethylene perfluoroalkyl vinyl ether copolymer). The release layer is formed on the outer peripheral surface of the elastic layer 33.

For example, the hardness of the outer peripheral surface of the pressing roller 30*p* is 40°-70° under a load of 9.8 N by an ASKER-C hardness meter. Thus, the area of the nip N and the durability of the pressing roller 30*p* are secured.

The pressing roller 30*p* can be moved toward and away from the heated roller 30*h* by the rotation of the cam member. When the pressing roller 30*p* is brought close to the heated roller 30*h* and pressed by a pressing spring, a nip N is formed. On the other hand, when the sheet S is jammed in the heating unit 30, the pressing roller 30*p* can be separated from the heated roller 30*h*, whereby the jammed sheet S can be removed. In addition, during sleep or an idle state, rotation of the cylindrical drum 35 is stopped and the pressing roller 30*p* is moved away from the heated roller 30*h*, thereby preventing unnecessary plastic deformation of the cylindrical drum 35.

The pressing roller 30*p* is rotated by a motor. When the pressing roller 30*p* rotates while the nip N is formed, the cylindrical drum 35 of the heated roller 30*h* is driven to rotate. The pressing roller 30*p* rotates to convey the sheet S in the conveying direction W through the nip N.

The heated roller 30*h* heats the toner image on the sheet S in the nip N. The heated roller 30*h* includes a cylindrical drum 35, a heater 40, a heat conductor 70, a support member 36, a stay 38, a temperature sensing element 60, and a thermometer 64.

The cylindrical drum 35 has a cylindrical shape. The cylindrical drum 35 includes a base layer, an elastic layer, and a release layer in this order from the inner peripheral side thereof. The base layer is a material such as nickel (Ni) or the like. The elastic layer is laminated on the outer peripheral surface of the base layer. The elastic layer is formed of an elastic material such as silicone rubber. The release layer is applied on the outer peripheral surface of the elastic layer. The release layer is formed of a material such as a PFA resin.

Figure 4:
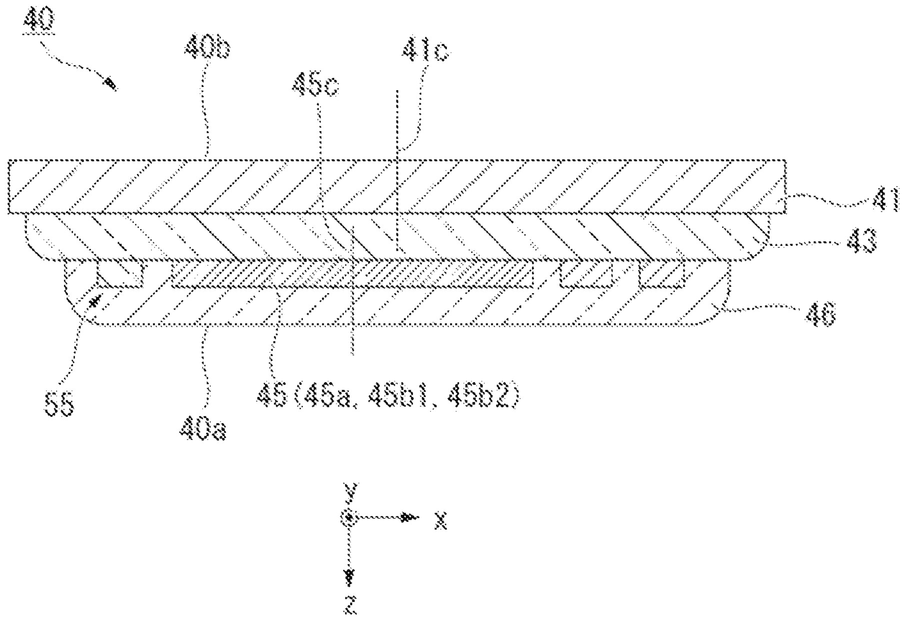
Figure 5:
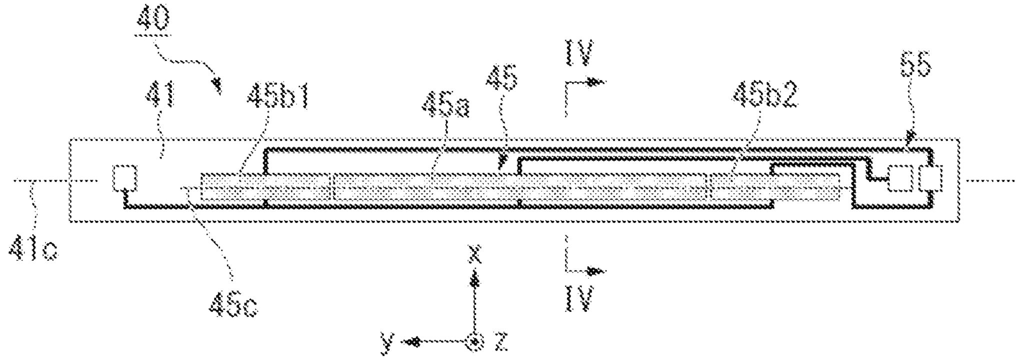
FIG. 5 is a bottom view of a heater.

FIG. 4 is a cross-sectional view of the heating unit 30 taken along the IV-IV line of FIG. 5. FIG. 5 is a bottom view of the heating unit 30 when viewed from the +z direction. The heater 40 includes a substrate 41, a heating element group set 45, and a wiring set 55.

The substrate 41 is made of a metal material such as stainless steel or a ceramic material such as aluminum nitride. The substrate 41 has a long rectangular plate shape. The substrate 41 is disposed inside the cylindrical drum 35. The longitudinal direction of the substrate 41 is parallel to the axial direction of the cylindrical drum 35.

In the present disclosure, the x direction, the y direction, and the z direction are defined as follows. The y direction is parallel to the longitudinal direction of the substrate 41. The +y direction is the direction from a central heating element 45*a* toward a first end heating element 45*b*1. The x direction is parallel to the lateral direction of the substrate 41. The +x direction corresponds to the transport direction of the sheet S during printing operations. The z direction is the direction normal to the substrate 41. The +z direction is a direction from the substrate 41 to the heating element group 45 or the first surface 40*a* of the heater 40 which comes into contact with the cylindrical drum 35. The −z direction is opposite to the +z direction, and is a direction from the first surface 40*a* of the heater to the second surface 40*b* of the heater 40 that contacts the heat conductor 70. The insulating layer 43 is formed on the surface of the substrate 41 in the +z direction by a glass material or the like.

As shown in FIG. 5, the heating element group 45 is disposed above the substrate 41. The heating element group 45 is formed of a silver-palladium alloy or the like. The heating element group 45 has a rectangular shape in which the long side extends along the y direction and the short side extends along the x direction. The center 45*c* in the x direction of the heating element group 45 is offset to the −x direction from the center 41*c* of the substrate 41 (the heater unit 40).

The heating element group 45 includes a first end heating element 45*b*1, a central heating element 45*a*, and a second end heating element 45*b*2 arranged side by side along the y direction. The central heating element 45*a* is disposed at a central portion in the y direction of the heating element group 45. The first end heating element 45*b*1 is disposed adjacent to the central heating element 45*a* and at the end portion of the heating element group 45 in the +y direction. The second end heating element 45*b*2 is disposed adjacent to the central heating element group 45*a* and at the end in the −y direction of the heating element group 45.

The heating element group 45 generates heat when energized. A sheet S having only a small width in the y direction can be positioned to pass through the center portion of the heating unit 30. In such a case, the control unit 6 causes only the central heating element 45*a* to generate heat. On the other hand, when a sheet S has a large width in the y direction, the control unit 6 causes the entire heating element group 45 to be energized. The central heating element 45*a* and the first and second end heating elements 45*b*1 and 45*b*2 can be independently controlled in heat generation. On the other hand, the first and second end heating elements 45*b*1 and 45*b*2 can be similarly controlled to one another during heat generation.

As shown in FIG. 4, the heating element group 45 and the wiring set 55 are formed on the surface of the insulating layer 43 on the +z direction side. A protective layer 46 is formed of a glass material or the like so as to cover the heating element group 45 and the wiring set 55. The protective layer 46 improves the sliding property (reduces friction) between the heater 40 and the cylindrical drum 35.

Similarly to the insulating layer 43 formed on the substrate 41 on the +z direction side, an insulating layer may be formed on the substrate 41 on the −z direction side. Similarly to the protective layer 46 formed on the substrate 41 on the +z direction side, a protective layer may be formed above the substrate 41 on the −z direction side. Thus, the warpage of the substrate 41 is suppressed.

As shown in FIG. 3, the heater 40 is disposed inside the cylindrical drum 35. That is, the heater 40 is disposed inside a region surrounded by the cylindrical film 35. Grease (not shown) is applied to the inner peripheral surface of the cylindrical drum 35. The first surface 40*a* of the heater 40 on the +z direction side comes into contact with the inner peripheral surface of the cylindrical drum 35 through grease. When the heater 40 generates heat, the viscosity of the grease is lowered. Thus, the sliding property between the heater 40 and the cylindrical drum 35 is secured.

A straight line CL connecting the center pc of the pressing roller 30*p* and the center hc of the heated roller 30*h* is depicted in FIG. 3. The center 41*c* in the x direction of the substrate 41 is shifted in the +x direction from the straight line CL. The center 45*c* of the heating element group 45 in the x direction is disposed on the straight line CL. The heating element group 45 is entirely included within the region of the nip N, and is disposed at the center of the nip N. Thus, the heat distribution of the nip N becomes more uniform, and a sheet S passing through the nip N will be more uniformly heated.

The heat conductor 70 is formed of a metal material having a high thermal conductivity such as copper. The heat conductor 70 has a similar outer shape (planar shape) as the substrate 41 of the heater 40 when viewed from the z direction. The heat conductor 70 is disposed in contact with at least a part of the second surface 40*b* on the −z direction side of the heater 40.

The support member 36 is made of a resin material such as a liquid crystal polymer. The support member 36 is disposed so as to cover the surface on the −z direction side of the heater 40 and the both sides in the x direction. The support member 36 supports the heater 40 via the heat conductor 70. Both end portions in the x direction of the support member 36 are curved to support the inner peripheral surface of the cylindrical drum 35 at both end portions in the x direction of the heater 40.

When a sheet S passing through the heating unit 30 is heated, a temperature distribution is generated across the heater 40 in accordance with the size of the sheet S. The local temperature of parts of the heater 40 may become a locally high temperature, such temperatures may exceed the upper-temperature limit of the support member 36 formed of a resin material. The heat conductor 70 functions to average or smooth the local temperature distribution of the heater 40. Thus, the support member 36 can be prevented from being overheated locally.

The stay 38 is formed of a steel sheet material or the like. A cross section of the stay 38 perpendicular to the y direction has a U shape. The stay 38 is mounted on the support member 36 on the −z direction side so as to cover the opening of the U shape along with the support member 36. The stay 38 extends along the y direction. Both end portions in the y direction of the stay 38 are fixed to the housing of the image processing apparatus 1. As a result, the heated roller 30*h* is supported by the image processing apparatus 1. The stay 38 improves the rigidity of the heated roller 30*h*. A flange for restricting the movement of the cylindrical drum 35 in the y direction is provided in the vicinity of both end portions in the y direction of the stay 38.

The temperature sensing element 60 is arranged on the surface of the heat conductor 70 on the −z direction side. The temperature sensing element 60 extends inside a hole passing through the support member 36 along the z direction.

The wiring of the temperature sensing element 60 can be pulled out in the −z direction from a wiring outlet hole in the supporting member 36 or the like. The temperature sensing element 60 comprises a heater temperature sensor 62 and a thermostat 68. For example, the heater temperature sensor 62 may be a thermistor.

Figure 6:
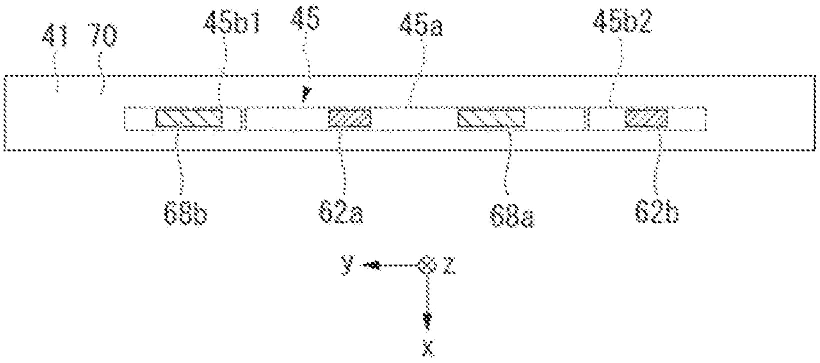
FIG. 6 is a plan view of a heater temperature sensor and a thermostat.

FIG. 6 is a plan view of the heater temperature sensor 62 and the thermostat 68 (as viewed from the −z direction). In FIG. 6, the supporting member 36 is not illustrated to permit description of other aspects. The heater temperature sensor 62 includes a central heater temperature sensor 62*a* and an end heater temperature sensor 62*b*. The thermostat 68 comprises a central thermostat 68*a* and an end thermostat 68*b*. The center heater temperature sensor 62*a* and the central thermostat 68*a* are disposed on the −z direction side of the central heating element 45*a*. On the other hand, the end heater temperature sensor 62*b* and the end thermostat 68*b* are disposed on the −z direction side of the first end heating element 45*b*1 and the second end heating element 45*b*2.

The heater temperature sensor 62 detects the temperature of the heater 40 via the heat conductor 70. The control unit 6 (refer to FIG. 1) acquires the temperature of the heating element group 45 from the heater temperature sensor 62 at the time of starting the heating unit 30. When the temperature of the heating element group 45 is lower than a predetermined temperature, the control unit 6 generates heat for a short time in the heating element group 45. Thereafter, the control unit 6 starts the rotation of the pressing roller 30*p*. Due to the heat generated by the heating element group 45, the viscosity of the grease applied to the inner peripheral surface of the cylindrical drum 35 is reduced. Thus, the sliding between the heater 40 and the cylindrical drum 35 at the time of starting the rotation of the pressing roller 30*p* is improved.

The heater temperature sensor 62 detects the temperature of the heat conductor 70.

In operation of the heating unit 30, the control unit 6 acquires the temperature of the heat conductor 70 by the heater temperature sensor 62. The control unit 6 controls the energization of the heating element group 45 so that the temperature of the heat conductor 70 in contact with the support member 36 is maintained below the heat resistant temperature of the support member 36.

When the temperature of the heater 40 detected through the heat conductor 70 exceeds a predetermined temperature, the thermostat 68 cuts off the power supply to the heating element group 45. As a result, excessive heating of the cylindrical drum 35 by the heater 40 is prevented.

As shown in FIG. 3, the thermometer 64 comes into contact with the inner peripheral surface of the cylindrical drum 35. The thermometer 64 detects the temperature of the cylindrical drum 35.

The control unit 6 acquires the temperature of the center portion and the end portion of the cylindrical drum 35 in the y direction during the operation of the heating unit 30. The control unit 6 controls the energization of the central portion heating element 45*a* based on the temperature measurement result at the center portion in the y direction of the cylindrical drum 35. The control unit 6 controls the energization of the first end heating element 45*b*1 and the second end heating element 45*b*2 based on the temperature at the end portion of the cylindrical drum 35 in the y direction.

First Embodiment

The heat conductor 70 according to a first embodiment will be described in detail.

Figure 7:
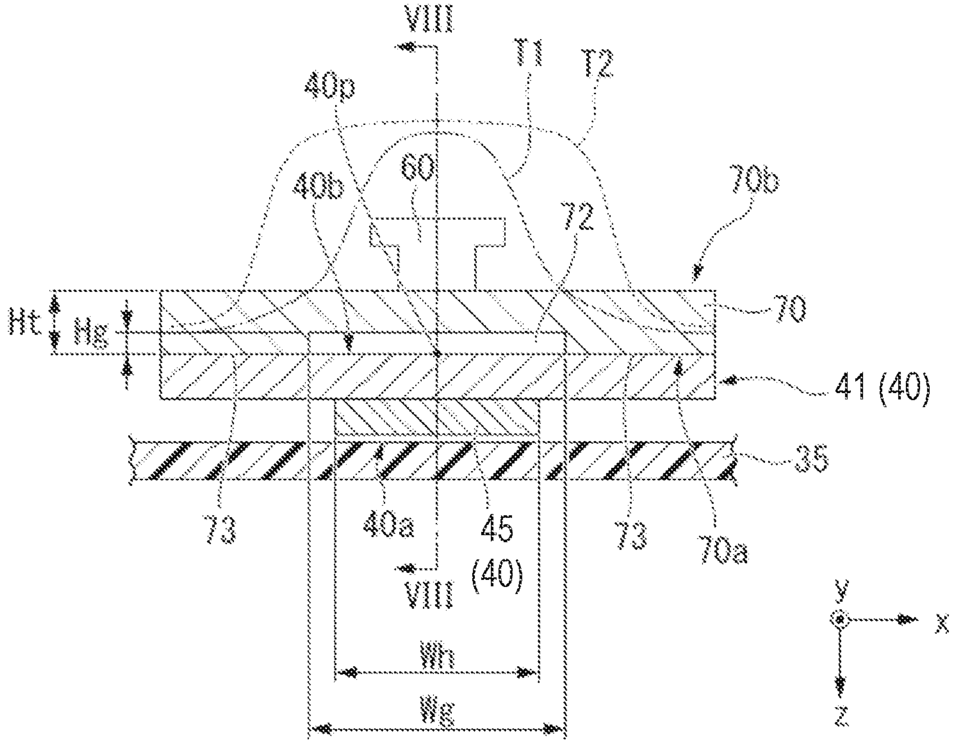
FIG. 7 is a cross-sectional view of a heat conductor and a heater according to a first embodiment.

FIG. 7 is a cross-sectional view of the heat conductor 70 and the heater unit 40 according to the first embodiment. FIG. 7 is a cross-sectional view taken along line VII-VII in FIG. 8. The heat conductor 70 has a groove 72 on the first surface 70*a* on the +z direction side. In the region where the groove 72 is formed, the heat conductor 70 is spaced apart from the heater 40. On both the +x direction side and the −x direction sides of the groove 72 in the first surface 70*a* of the heat conductor 70, a contact portion 73 contacting the heater 40 is formed.

When printing is started in the image processing apparatus 1, the heating element group 45 raises the temperature of the cylindrical drum 35 to the fixing temperature. When the heating element group 45 begins generates heat for heating from the normal resting or idle temperature of the heater 40, the temperature distribution in the initial stage of the heat generation corresponds to the graph line T1. The graph lines T1 and T2 show the temperature distribution along the x direction on the second surface 40*b* of the heater 40. As shown by the graph line T1, the temperature distribution of the second surface 40*b* of the heater 40 becomes a relatively sharp peak centered about the temperature peak position 40*p*. The temperature peak position 40*p* corresponds to the center portion of the heating element group 45 along the x direction. The groove 72 of the heat conductor 70 is formed at a position above the position on the second surface 40*b* corresponding to the temperature peak position 40*p*.

When the groove 72 is not formed at such a position, the heat conductor 70 is brought into contact with the temperature peak position 40*p* of the heater 40. In such a case, much of the heat of the heater 40 is transferred to the heat conductor 70 and thus not to the cylindrical drum 35. However, when the groove 72 is formed at the location where the temperature reaches the peak, more of the heat of the heater 40 can be transferred to the cylindrical drum 35 instead of the heat conductor 70. Therefore, the cylindrical drum 35 can be efficiently heated.

The depth Hg of the groove 72 in the z direction is desirably 20-50% of the thickness Ht in the z direction of the heat conductor 70. The width Wg of the groove 72 in the x direction may be larger than the width Wh of the heating element group 45 in the x direction. As a result, much of heat generated in the heating element group 45 is not transferred to the heat conductor 70, but rather is transferred to the cylindrical drum 35. Therefore, the cylindrical drum 35 is efficiently heated.

Figure 9:
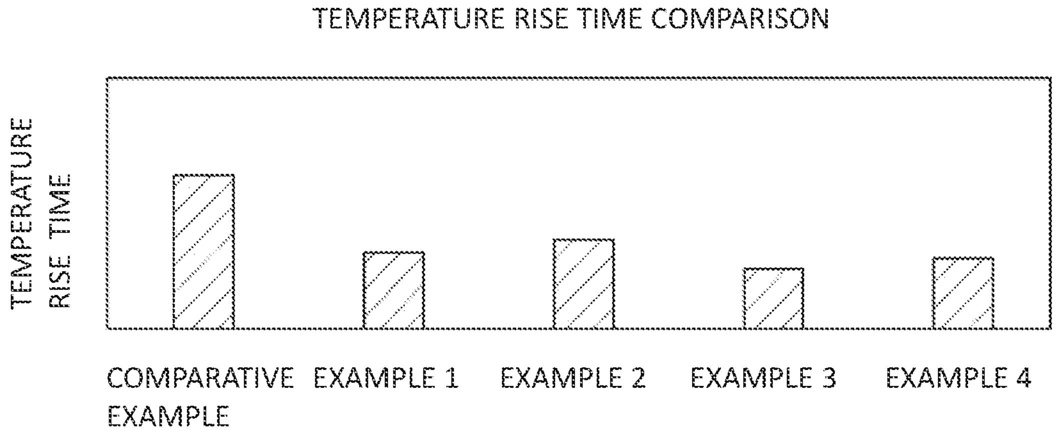
FIG. 9 is a chart showing a temperature rise time of a cylindrical drum.

FIG. 9 is a chart showing temperature rise times of cylindrical drums in various examples. The temperature rise time required for the temperature of the cylindrical drum 35 to reach the fixing temperature is compared with a comparative example. In a heater of the comparative example, a groove is not formed in the heat conductor. In the heater 40 of each of Examples 1-3 according to the first embodiment, the widths Wg (see FIG. 7) in the x-direction width of the groove 72 are different from each other. The width Wg of the groove 72 of Example 1 is the smallest, and the width Wg of the groove 72 of Example 3 is the largest. The width Wg in the x direction of the groove 72 in Examples 1 and 2 is smaller than the width Wh in the x direction of the heating element group 45 (refer to FIG. 7). The width Wg of the groove 72 in Example 3 is larger than the width Wh of the heating element group 45 (refer to FIG. 7).

As shown in FIG. 9, in the heater of the comparative example, the temperature rise time until the cylindrical drum 35 reaches the fixing temperature is long. On the other hand, in the heater 40 of each of Example 1-3, the temperature rise time until the cylindrical drum 35 reaches the fixing temperature is approximately half of the one of the comparative example. The temperature rise time of Example 3 is equal to or slightly shorter than the temperature rise times of Examples 1 and 2. In this manner, in the heater 40 of the first embodiment, the temperature rise time of the cylindrical drum 35 is shortened. Therefore, in the heater 40 of the first embodiment, it is possible to shorten the time required to start printing.

The heating element group 45 after the start of heat generation continues to generate heat while the supply power is adjusted, so that the cylindrical drum 35 is maintained at the fixing temperature. Heat generated in the heating element group 45 is easily transferred to the cylindrical drum 35, and is hardly transferred to the heat conductor 70. Therefore, power consumption for maintaining the cylindrical drum 35 at the fixing temperature is reduced, and the temperature rise of the heat conductor 70 is suppressed. When the cylindrical drum 35 is maintained at the fixing temperature, the temperature distribution of the second surface 40*b* of the heater 40 is as depicted by the graph line T2 shown in FIG. 7. As shown by the graph line T2, the temperature distribution of the second surface 40*b* of the heater 40 has an approximately trapezoidal shape or rounded mesa shape. Even at positions in the +x direction and the −x direction away from the temperature peak position 40*p*, the temperature becomes high. Since the heat conductor 70 has the contact portion 73 on the +x direction side and the −x direction side of the groove 72, heat generated on the +x direction side and −x direction side of the heater 40 is transferred to the heat conductor 70, and the temperature rise in the heater 40 is suppressed.

Figure 10:
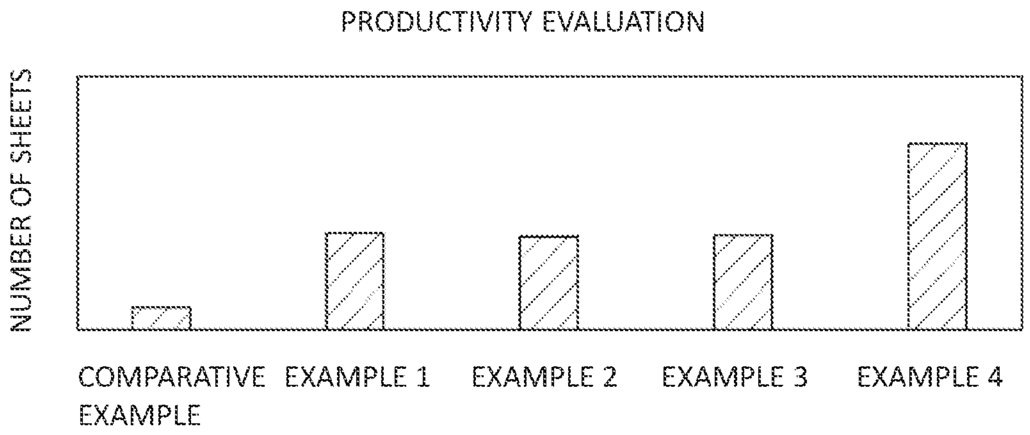
FIG. 10 is a chart showing the number of sheets which can be continuously printed by various example configurations.

FIG. 10 is a chart showing the number of continuous printable sheets. The number of sheets S which can be printed in succession until the temperature of the second surface 70*b* of the heat conductor 70 exceeds a predetermined temperature can be compared with each other. In the heating unit of the comparative example, the number of sheets that can be printed in quick succession (continuously) without stopping is small. When the cylindrical drum 35 is maintained at the fixing temperature, a large amount of heat is transferred to the heat conductor 70, so the temperature of the second surface 70*b* of the heat conductor 70 tends to become high. In the heating unit 30 of each of Examples 1-3, the number of continuous printable sheets is about several times the number of comparative example. When the cylindrical drum 35 is maintained at the fixing temperature, most heat is not transferred to the heat conductor 70, and the transferred heat is dispersed in the respective portions of the heat conductor 70. Therefore, in the heater 40 of each of Examples 1-3, the temperature of the second surface 70*b* of the heat conductor 70 is not very high, and the number of sheets which can be printed without stopping (continuously) to prevent overheating can be increased. Therefore, in the heating unit 30 of the first embodiment, the productivity of printing can be improved.

Figure 8:
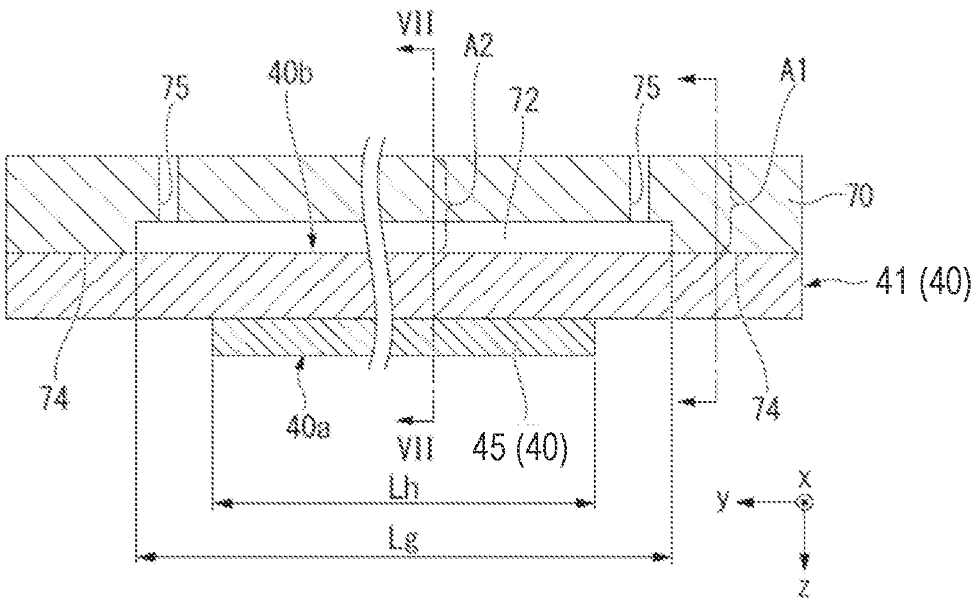
FIG. 8 is a side cross-sectional view of the heat conductor and the heater according to the first embodiment.

FIG. 8 is a side cross-sectional view of the heat conductor 70 and the heater 40 according to the first embodiment. FIG. 8 is a cross-sectional view taken along the line VIII-VIII in FIG. 7. In FIG. 8, temperature sensing element 60 is omitted from the depiction. When the heating element group 45 begins to generate heat to increase the heater 40 from the normal resting or idle temperature, the temperature distribution of the second surface 40*b* of the heater 40 along the y direction will be similar to the one along the x direction as already described above. The temperature peak position along the y direction is at the center position along the y direction of the heating element group 45. The groove 72 of the heat conductor 70 is formed to be above the position along the y direction where the temperature of the heater 40 reaches its peak. The length Lg in the y direction of the groove 72 is larger than the length Lh in the y direction of the heating element group 45. In the region where the heating element group 45 is formed, the shape of the x-z cross section of the groove 72 is uniform. Therefore, the thermal condition in the −z direction of the heating element group 45 becomes substantially uniform along the y direction. Thus, the cylindrical drum 35 arranged in the +z direction of the heating element group 45 is heated substantially uniformly along the y direction.

The heating element group 45 has a length in the y direction longer than the maximum size of the sheet S in the y direction. The groove 72 is longer than the heating element group 45 in the y direction. The heat conductor 70 is longer than the groove 72 in the y direction. That is, the heat conductor 70 extends beyond the heating element group 45 in the y direction. The cross sectional area of the x-z cross section (a cross section taken perpendicular to the y direction) of the heat conductor 70 at a position A1 outside (beyond) the end of the heating element group 45 in the y direction is referred to as the first cross-sectional area A1. More particularly, the position A1 at which the first cross-sectional area A1 is taken is outside of the groove 72. The cross-sectional area of the x-z cross section of the heat conductor 70 taken perpendicular to the y direction at position A2 is referred to as the second cross-sectional area A2. The position A2 at which the second cross-sectional area A2 taken is inside the groove 72. The heat conductor 70 is formed so that the first cross-sectional area A1 is larger than the second cross-sectional area A2.

The heat conductor 70 has a contact portion 74 abutting the heater 40 in an outer region beyond the groove 72 in the y direction. The contact portion 74 can be referred to as a non-formation region of the groove 72, which means the contact portion 74 excludes the portion(s) of the heat conductor 70 in which the groove 72 has been formed. The first cross-sectional area A1 (x-z cross section) taken at the contact portion 74 is larger than the second cross-sectional area A1 (xz cross section) taken at the inner region of the heat conductor where the groove 72 has been formed. The inner region of the heat conductor 70 also corresponds to the position along the y-direction of the heating element group 45. Thus, the heat capacity of the contact portion 74 becomes larger than the heat capacity of the region in which the groove 72 is formed.

The heating element group 45 generates heat in a wider range than the size of the sheet S in the y direction. When the sheet S passes through the heating unit 30, the sheet S deprives the heat of the heater 40. In the y direction of the heater 40, the passing area of the sheet S is cooled, but the non-passing area of the sheet S is not cooled. Therefore, both ends of the heater 40 in the y direction tend to become high temperatures. The heat conductor 70 has the contact portion 74 in the outer region in the y direction of the groove 72. Heat at both end portions in the y-direction of the heater 40 is easily transferred to the heat conductor 70 from the contact portion 74. Therefore, the temperature rise at both ends in the y direction of the heater 40 is suppressed.

The heat conductor 70 is brought into contact with the second surface 40*b* of the heater 40 at the entire peripheral edge portion of the groove 72 by the contact portion 74 and the contact portion 73 (refer to FIG. 7). Therefore, the groove 72 is sealed by the heater 40. The heat conductor 70 has a through hole 75. The through hole 75 penetrates through the heat conductor 70 along the z direction and is connected to the groove 72. When the support member 36 (see FIG. 3) is disposed on the −z direction side of the heat conductor 70, a through hole connected to the through hole 75 of the heat conductor 70 is also formed in the support member 36. The air in the groove 72 which has become high pressure due to the temperature rise is discharged to the outside through the through hole 75. Therefore, the contact portion 74 and the contact portion 73 in the heat conductor 70 are prevented from being lifted from the heater 40. Accordingly, the heat of the heater 40 is transferred to the heat conductor 70 through the contact portion 74 and the contact portion 73.

The through hole 75 is formed outside the heating element group 45 in the y direction. Therefore, the thermal condition in the −z direction of the heating element group 45 becomes substantially uniform along the y direction. Thus, the cylindrical drum 35 arranged on the +z direction side of the heating element group 45 is heated substantially uniformly along the y direction.

As described in detail above, the heating unit 30 includes the cylindrical drum 35, the heating element group 45, the heater 40, the heat conductor 70, and the temperature sensing element 60. The heating element group 45 is arranged inside the cylindrical drum 35, and the axial direction of the cylindrical drum 35 is parallel to the longitudinal direction. The heater 40 has the first surface 40*a* on the +z direction side abutting the inner surface of the cylindrical drum 35. The heat conductor 70 is in contact with a part of the second surface 40*b* of the heater 40 on the side opposite to the first surface 40*a*. The heat conductor 70 has the groove 72 positioned where the temperature distribution of the second surface 40*b* heated by the heating element group 45 reaches the peak, which is the temperature peak position 40*p*. The temperature sensing element 60 is disposed on the surface of the heat conductor 70 in the −z direction.

The groove 72 of the heat conductor 70 is formed corresponding to such a temperature peak position 40*p* of the temperature distribution on the heater 40. Therefore, much of the heat of the heater 40 is transferred to the cylindrical drum 35 rather than being transferred to the heat conductor 70. Thus, since the cylindrical drum 35 is heated efficiently, it is possible to shorten the time required to start printing.

The temperature sensing element 60 is disposed on the surface of the heat conductor 70 in the −z direction. The temperature sensing element 60 detects the temperature of the heat conductor 70 with high accuracy. Thus, control for maintaining the temperature of the heat conductor 70 below a predetermined temperature can be performed with high accuracy. For example, the predetermined temperature is a heat resistant temperature of the support member 36 (see FIG. 3) which is in contact with the heat conductor 70.

As compared with the case where the temperature sensing element 60 is disposed inside the groove 72, the degree of freedom in design of the temperature sensing element 60 and the groove 72 is increased. Further, wiring of the temperature sensing element 60 is facilitated.

The heat conductor 70 extends to the beyond the heating element group 45 in the y direction. The cross-sectional area of the heat conductor 70 in the x-z cross section in at least a part of the outer region of the heating element group 45 is referred to as the first cross-sectional area A1. The cross-sectional area of the heat conductor 70 in the x-z cross section in the inner region of the heating element group 45 is referred to as the second cross-sectional area A2. The first cross-sectional area A1 of the heat conductor 70 is larger than the second cross-sectional area A2 of the heat conductor 70.

Since the outer region of the heating element group 45 in the y direction is a non-passing region of the sheet S, it tends to be higher in temperature than the inner region. The first cross-sectional area A1 of the heat conductor 70 is larger than the second cross-sectional area A2 of the heat conductor 70. The heat capacity of the heat conductor 70 in the outer region of the heating element group 45 is larger than the heat capacity in the inner region. Therefore, heat in the outer region of the heating element group 45 is easily transferred to the heat conductor 70. Thus, temporary stop of printing for eliminating temperature excess of the heating unit 30 is suppressed, and productivity of printing is improved.

The heat conductor 70 comes into contact with the second surface 40*b* of the heater 40 at the entire peripheral edge portion of the groove 72. The heat conductor 70 has the through hole 75 that penetrates through the heat conductor 70 and is connected to the groove 72.

The air in the groove 72 which has become high pressure due to the temperature rise is discharged to the outside through the through hole 75. Therefore, floating of the heat conductor 70 from the heater 40 is suppressed. As a result, the heat of the heater 40 is transferred to the heat conductor 70 at the time of printing.

Figure 11:
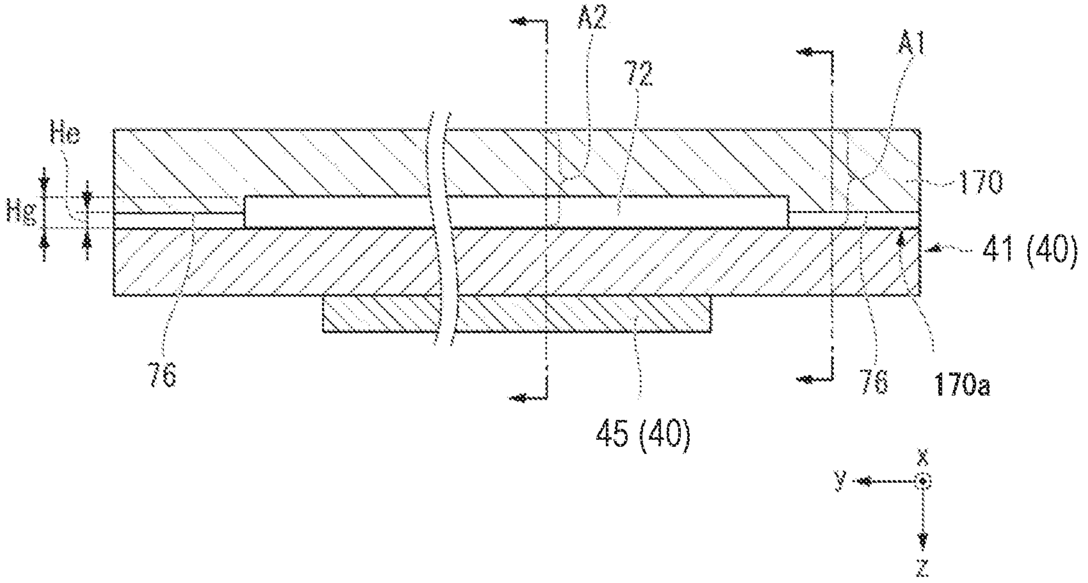
FIG. 11 is a cross-sectional view of a heat conductor and a heater according to a first modification of the first embodiment.

FIG. 11 is a side cross-sectional view of a heat conductor 170 and a heater unit 30 according to a first modification of the first embodiment. FIG. 11 is a side cross-sectional view corresponding to FIG. 8 of the first embodiment.

Similarly to the heat conductor 70 in the first embodiment, the heat conductor 170 in the first modification is formed so that the first cross-sectional area A1 is larger than the second cross-sectional area A2, which is in the same manner as the heat conductor 70 in the first embodiment (see FIG. 7). The first cross-sectional area A1 is a cross-sectional area of the x-z cross section of the heat conductor 70 (that is, the cross section perpendicular to the y direction) in at least a part outside (beyond) the position of the heating element group 45 in the y direction. Specifically, the first cross-sectional area A1 is the cross-sectional area of the x-z cross section of the heat conductor 70 outside the groove 72. The second cross-sectional area A2 is the cross-sectional area of the x-z cross section of the heat conductor 70 in the inner region where the groove 72 is formed, which also corresponds in position to the position of the heating element group 45 along the y direction.

The heat conductor 170 in the first modification example has an outer groove 76 beyond the groove 72 in the y direction. Similarly to the groove 72, the outer groove 76 is formed on the first surface 170*a* on the +z direction side of the heat conductor 70. The depth He of the outer groove 76 in the z direction is smaller than the depth Hg of the groove 72 in the z direction. Accordingly, the first cross-sectional area A1 of the heat conductor 170 outside the groove 72 is still larger than the second cross-sectional area A2 of the heat conductor 170 in the inner region corresponding to position of groove 72. The width of the outer groove 76 in the x direction is equal to or less than the width in the x direction of the groove 72. The outer groove 76 can extend in the y direction from an outer edge of the groove 72 to the outer edge of the heat conductor 170. The groove 72 is thus connected with the outside through the outer groove 76. Therefore, the through hole 75 (see FIG. 8) is not necessarily formed in the heat conductor 170 of the first modification example.

In the heat conductor 170 in the first modified example, the first cross-sectional area A1 is still larger than the second cross-sectional area A2 in the same manner as the first embodiment. Therefore, heat in the outer region of the heating element group 45 is more easily transferred to the heat conductor 70. Thus, temporary stopping of printing for eliminating temperature excesses of the heating unit 30 can be suppressed, and productivity of printing is improved.

In the heat conductor 170 in the first modification example, the through hole 75 need not be formed. Therefore, when the support member 36 (see FIG. 3) is disposed on the −z direction side of the heat conductor 70, there is no need to form through holes in the support member 36 to be connected to the through hole(s) 75 in the heat conductor 70. Therefore, the degree of freedom in design of the support member 36 and the like is improved.

Second Embodiment

Figure 12:
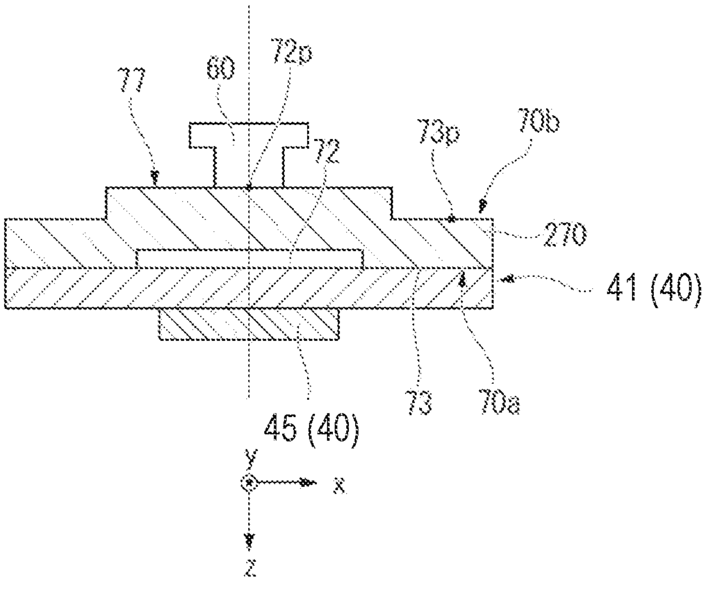
FIG. 12 is a cross-sectional view of a heat conductor and a heater according to a second embodiment.

FIG. 12 is a cross-sectional view of a heat conductor 270 and a heater 40 according to a second embodiment. The heat conductor 270 in the second embodiment is different from the heat conductor 70 in the first embodiment in that it has a convex portion 77 on the second surface 70*b*. The convex portion 77 may be referred to as a protrusion or protruding portion in some contexts.

A groove 72 is formed in the first surface 70*a* of the heat conductor 270, and the convex portion 77 is formed on the second surface 70*b*. The convex portion 77 is located on the −z direction side the heat conductor 270. The convex portion 77 is formed above at least the groove 72. The uppermost surface of the heat conductor 270 on the −z direction side is referred to as a first upper surface portion 72*p*. The upper surface portion 72*p* is in the central region of the heat conductor 270 in the y direction. The upper surface of the heat conductor 270 in the peripheral region beyond the central region in the y direction is referred to as a second upper surface portion 73*p*. The first upper surface portion 72*p* is further from the substrate 40 in the −z direction than is the second upper surface portion 73*p*.

Accordingly, the difference between the second cross-sectional area A2 and the first cross-sectional area A1 becomes smaller. In this context, the second cross-sectional area A2 is the cross-sectional area of the x-z cross section of the heat conductor 270 where the groove 72 is formed. The first cross-sectional area A1 is the cross-sectional area of the x-z cross section of the heat conductor 270 where the groove 72 is not formed. Therefore, the heat capacity of the heat conductor 270 where the groove 72 is formed becomes closer to the heat capacity of the heat conductor 270 where the groove 72 is not formed. Thus, the heat capacity of the heat conductor 270 is better averaged in the x direction and the y direction and the overall heat capacity of the heat conductor 270 can be increased.

The heat conductor 270 may be formed by pressing a metal plate. In such a case, the groove 72 and the protrusion 77 can be formed at the same time, and the thickness of the heat conductor 270 becomes even. The second cross-sectional area A1 of the heat conductor 270 where the groove 72 is formed becomes similar or equal to the first cross-sectional area A2 where the groove 72 is not formed. As a result, the heat capacity across the heat conductor 270 is better averaged.

The temperature rise time and the number of continuous printable sheets of the heater 40 according to the second embodiment is shown as Example 4 in FIGS. 9 and 10. The width Wg in the x-direction (see FIG. 7) of the groove 72 in Example 4 is the same as that in Example 2. As shown in FIG. 9, in the heater 40 of Example 4, the temperature rise time until the cylindrical drum 35 reaches the fixing temperature is equivalent to that of each Example 1-3. As shown in FIG. 10, in the heater 40 of Example 4, the number of sheets that can be printed without stop (continuously) is about 2 times than that of each Example 1-3. In Example 4, the heat capacity of the heat conductor 270 is larger than that of each Example 1-3. Therefore, it is considered that the heat conductor 270 is unlikely to be unintentionally heated to a high temperature.

In the heat conductor 270 in the second embodiment, the first end portion 72*p* is arranged on the −z direction side of the second end portion 73*p*. The first end portion 72*p* is an end portion in the −z direction of the heat conductor 270 where the groove 72 is formed. The second end portion 73*p* is an end portion in the −z direction of the heat conductor 270 where the groove 72 is not formed.

Thus, the heat capacity of the heat conductor 270 is averaged in the x direction and the y direction and the heat capacity of the heat conductor 270 is increased. The heat of the heater 40 is easily transferred to the heat conductor 270. Therefore, temporary stop of printing for eliminating temperature excess of the heating unit 30 is suppressed, and productivity of printing is improved.

Third Embodiment

Figure 13:
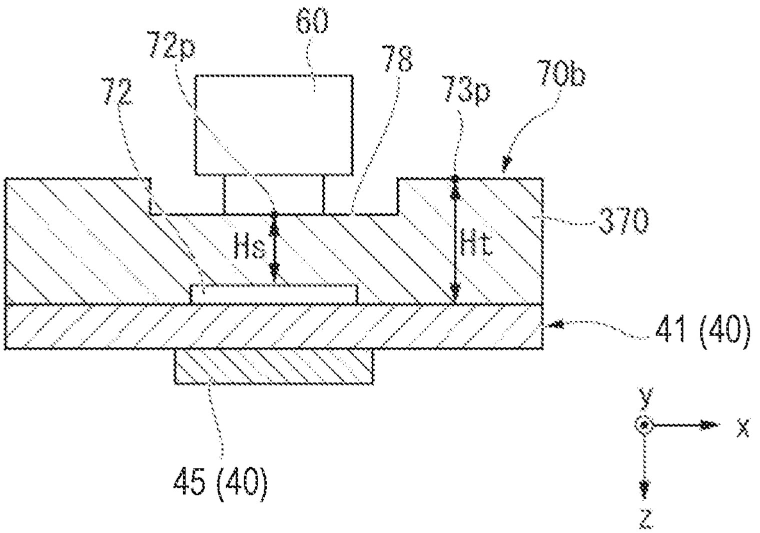
FIG. 13 is a cross-sectional view of a heat conductor and a heater according to a third embodiment.

FIG. 13 is a cross-sectional view of a heat conductor 370 and a heater 40 according to a third embodiment. The heat conductor 370 in the third embodiment is different from the first embodiment in that a concave portion 78 for mounting the temperature sensing element 60 is provided on the second surface 70*b*.

The heat conductor 370 has the concave portion 78 on the second surface 70*b*. The temperature sensing element 60 is mounted on the bottom surface of the concave portion 78. The thickness Hs in the z-direction of the heat conductor 370 where the temperature sensing element 60 is mounted, is smaller than the thickness Ht in the z direction of the heat conductor 370 where the temperature sensing element 60 is not mounted. The width in the x direction and the y direction of the concave portion 78 is equal to or slightly larger than that of the temperature sensing element 60.

Since the temperature sensing element 60 is mounted on the bottom surface of the concave portion 78, the distance between the temperature sensing element 60 and the heater 40 is reduced. In this way, the temperature sensing element 60 detects the temperature of the heater 40 with high accuracy.

The concave portion 78 is formed on the second surface 70*b* of the heat conductor 370 where the temperature sensing element 60 is mounted. An end portion of the heat conductor 370 on the −z direction side where the temperature sensing element 60 is mounted, is referred to as a first end portion 72*p*. An end portion in the −z direction of the heat conductor 370 where the temperature sensing element 60 is not mounted, is referred to as a second end portion 73*p*. The first end portion 72*p* is located on the +z direction side from the second end portion 73*p*.

Conversely, the second end portion 73*p* is arranged on the −z direction side from the first end portion 72*p*. Thus, the reduction in the cross-sectional area of the heat conductor 370 in the x-z cross section is suppressed, and the decrease in the heat capacity of the heat conductor 370 is suppressed. The heat of the heater 40 is easily transferred to the heat conductor 270. Therefore, temporary stop of printing for eliminating temperature excess of the heating unit 30 is suppressed, and productivity of printing is improved.

Fourth Embodiment

Figure 14:
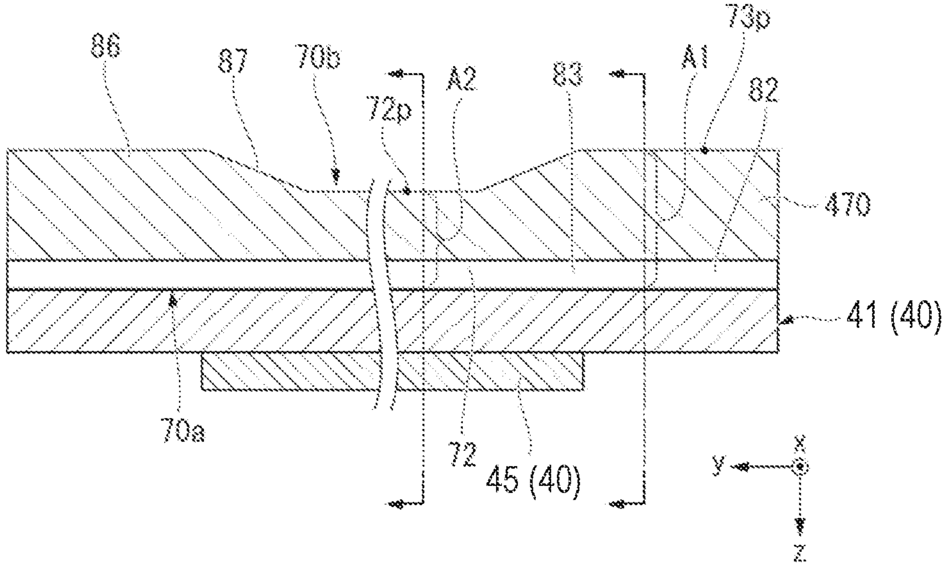
FIG. 14 is a side cross-sectional view of a heat conductor and a heater according to a fourth embodiment.
Figure 15:
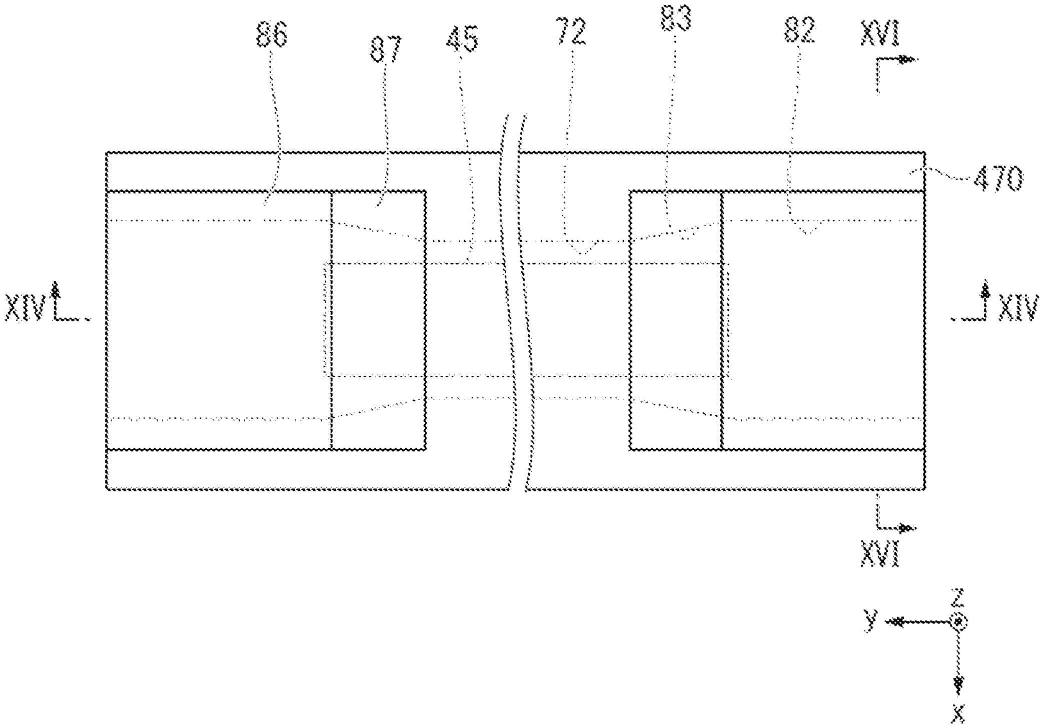
FIG. 15 is a plan view of the heat conductor and the heater according to the fourth embodiment.
Figure 16:
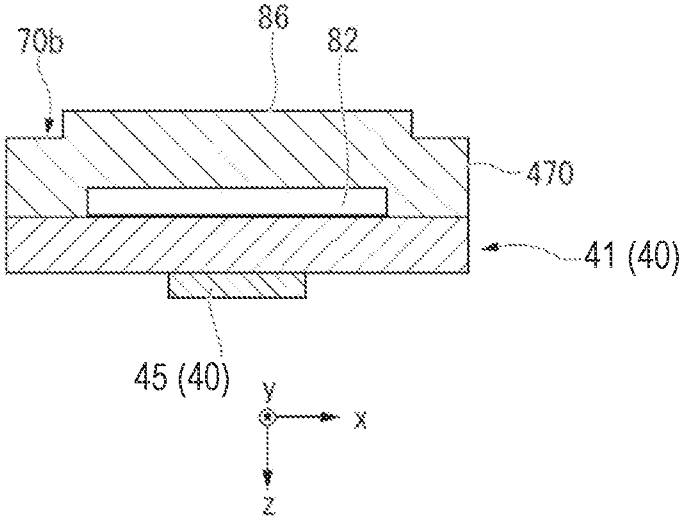
FIG. 16 is a cross-sectional view of the heat conductor and the heater according to the fourth embodiment.

FIG. 14 is a side cross-sectional view of a heat conductor 470 and a heater 40 according to a fourth embodiment. FIG. 15 is a plan view, and FIG. 16 is a cross-sectional view of the heat conductor 470 and the heater 40. FIG. 14 is a cross-sectional view taken along line XIV-XIV in FIG. 15. FIG. 16 is a cross-sectional view taken along line XVI-XVI in FIG. 15. The heat conductor 470 in the fourth embodiment is different from the first embodiment in the shape of the end portion in the y direction of the groove 72.

As shown in FIG. 14, the heat conductor 470 has an outer groove 82 connected to the groove 72 and extending along the +y and −y directions. Similarly to the groove 72, the outer groove 82 is formed on the first surface 70*a* on the +z direction side of the heat conductor 470. The depth of the outer groove 82 in the z direction is equal to the depth of the groove 72 in the z direction. As shown in FIG. 15, the width in the x direction of the outer groove 82 is larger than the width in the x direction of the groove 72. The outer groove 82 is formed from the vicinity of the end portion in the y direction of the heating element group 45 to the end portion in the y direction of the heat conductor 470. An intermediate groove 83 in which the width in the x direction continuously varies is formed between the groove 72 and the outer groove 82. The groove 72 communicates with the outside via the intermediate groove 83 and the outer groove 82. Therefore, the through hole 75 as shown in FIG. 8 is not formed in the heat conductor 470 of the fourth embodiment.

As shown in FIG. 16, the heat conductor 470 has a convex portion 86 on the second surface 70*b*. That is, the heat conductor 470 has a recess formed on the second surface 70*b* side. The surface of the convex portion 86 is located on the −z direction side of the heat conductor 470. As shown in FIG. 15, the convex portion 86 is formed over at least the outer groove 82. As shown in FIG. 14, the end portion of the heat conductor 470 on the −z direction side where the outer groove 82 is located is referred to as a second end portion 73*p*. The end of the heat conductor 470 on the −z direction side where the outer groove 82 is not formed, is referred to as a first end portion 72*p*. The second end portion 73*p* is disposed on the −z direction side of the first end portion 72*p*.

An inclined portion 87 for which the height in the z direction continuously varies from the second end portion 73*p* toward the first end portion 72*p* is provided. As shown in FIG. 15, the inclined portion 87 is formed over at least the intermediate groove 83.

In FIG. 14, the cross-sectional area of the x-z cross section of the heat conductor 270 where the outer groove 82 is formed, is defined as a first cross-sectional area A1. The cross-sectional area of the x-z cross section of the heat conductor 270 where the outer groove 82 is not formed (that is, where the groove 72 is formed), is defined as a second cross-sectional area A2. As described above, the outer groove 82 is formed on the first surface 70*a* of the heat conductor 270, while the convex portion 86 is formed on the second surface 70*b*. Therefore, the first cross-sectional area A1 of the heat conductor 470 is equal to the second cross-sectional area A2. Thus, the heat capacity of the heat conductor 270 where the outer groove 82 is formed is equal to the heat capacity of the heat conductor 270 where the outer groove 82 is not formed. The same applies to the heat capacity of the heat conductor 270 where the intermediate groove 83 is formed.

As described above, the heat conductor 470 has the outer groove 82 in the outer region of the heating element group 45. The outer groove 82 is wider in the x-direction than the groove 72 formed in the inner region of the heating element group 45.

Therefore, heat in the outer region of the heating element group 45 is more easily transferred to the cylindrical drum 35. Thereby, the end portion of the cylindrical drum 35 on the y direction side can be more efficiently heated. In particular, when the cylindrical drum 35 is heated from a low temperature state, heat dissipation to the y-direction end portion of the cylindrical drum 35 can be compensated for. Therefore, the low temperature offset of the cylindrical drum 35 is suppressed.

In the heat conductor 470, the second end portion 73*p* is disposed on the −z direction side of the first end portion 72. The second end portion 73*p* is an end portion on the −z direction side of the heat conductor 470 where the outer groove 82 is formed. The first end portion 72*p* is an end portion on the −z direction side of the heat conductor 470 where the outer groove 82 is not formed.

Thus, heating of the heat conductor 270 is averaged along the x direction and the y direction and the heat capacity of the heat conductor 270 is increased. After the cylindrical drum 35 is sufficiently heated, heat of the heater 40 is more easily transferred to the heat conductor 270. Therefore, temporary stops in the printing process to permit the eliminating temperature excesses in the heating unit 30 is suppressed, and productivity of printing is improved.

The image processing apparatus 1 according to an embodiment is an image forming apparatus, and the heating unit 30 is a fixing unit. However, the image processing apparatus 1 may be a decoloring apparatus, and the heating unit 30 may be a decoloring unit. The decoloring apparatus performs a process of decoloring or erasing an image formed on a sheet by a decolorable toner. The decoloring unit heats the decolorable toner image formed on the sheet passing through the nip to decolorize the toner image.

According to at least one embodiment described above, the heating unit 30 includes the groove 72 of the heat conductor 70 formed at the temperature peak position 40*p* of the heater 40. Thus, it is possible to shorten the time required to start printing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The embodiments and variations thereof are included within the scope and spirit of the invention as well as the scope of the appended claims.

What is claimed is:

1. A heating device, comprising:
a rotatable film;
a heater disposed inside the film and including:
  a substrate that extends along a first direction and has two surfaces opposite to each other, and
  a heater element on one of the surfaces of the substrate; and
a heat conductor including:
  a first portion contacting the other surface of the substrate, a second portion that is adjacent to the first portion in a second direction perpendicular to the first direction and does not contact the other surface of the substrate, and a third portion that is adjacent to the second portion in the first direction;

a first groove between the second portion of the heat conductor and the substrate; and a second groove between the third portion of the heat conductor and the substrate, wherein a width of the second portion is wider than the heater element in the second direction.

2. The heating device according to claim 1, wherein a thickness of the first portion of the heat conductor in a third direction perpendicular to the first and second directions is greater than a thickness of the second portion in the third direction.

3. The heating device according to claim 1, further comprising:

a temperature sensing element on a first surface of the heat conductor at a position corresponding to the second portion.

4. The heating device according to claim 3, wherein the first surface of the heat conductor has a recess.

5. The heating device according to claim 4, wherein the temperature sensing element is in the recess.

6. The heating device according to claim 4, wherein the recess has a bottom surface that is closer to the first surface than to a second surface of the heat conductor that is opposite to the first surface.

7. The heating device according to claim 1, wherein a first cross-sectional area, taken perpendicular to the first direction, of the first portion is greater than a second cross-sectional area of the second portion, taken perpendicular to the first direction.

8. The heating device according to claim 1, wherein the second groove extends from the first groove to an outer edge of the heat conductor along the second direction.

9. The heating device according to claim 1, wherein the first groove extends from one end of the heat conductor to the other end of the heat conductor along the first direction.

10. An image processing apparatus, comprising:

a heating device including:

a rotatable film, a heater disposed inside the film and including:

a substrate that extends along a first direction and has two surfaces opposite to each other, and a heater element on one of the surfaces of the substrate, and a heat conductor including:

a first portion contacting the other surface of the substrate, a second portion that is adjacent to the first portion in a second direction perpendicular to the first direction and does not contact the other surface of the substrate, and a third portion that is adjacent to the second portion in the first direction, a first groove between the second portion of the heat conductor and the substrate, and a second groove between the third portion of the heat conductor and the substrate; and a controller configured to control the heating device for an image processing operation, wherein a width of the second portion is wider than the heater element in the second direction.

11. The image processing apparatus according to claim 10, wherein a thickness of the first portion of the heat conductor in a third direction perpendicular to the first and second directions is greater than a thickness of the second portion in the third direction.

12. The image processing apparatus according to claim 10, wherein the heating device further includes a temperature sensing element on a first surface of the heat conductor at a position corresponding to the second portion.

13. The image processing apparatus according to claim 12, wherein the first surface of the heat conductor has a recess.

14. The image processing apparatus according to claim 13, wherein the temperature sensing element is in the recess.

15. The image processing apparatus according to claim 13, wherein the recess has a bottom surface that is closer to the first surface than a second surface of the heat conductor that is opposite to the first surface.

16. The image processing apparatus according to claim 10, wherein a first cross-sectional area, taken perpendicular to the first direction, of the first portion is greater than a second cross-sectional area of the second portion, taken perpendicular to the first direction.

* * * * *